United States Patent
Martinez et al.

(10) Patent No.: US 8,219,856 B2
(45) Date of Patent: Jul. 10, 2012

(54) MEMORY GROWTH DETECTION

(75) Inventors: Robbie Martinez, Frisco, TX (US); Zack Guthrie, Plano, TX (US)

(73) Assignee: Alcatel Lucent, Paris (FR)

( * ) Notice: Subject to any disclaimer, the term of this patent is extended or adjusted under 35 U.S.C. 154(b) by 393 days.

(21) Appl. No.: 12/157,739

(22) Filed: Jun. 12, 2008

(65) Prior Publication Data

US 2008/0250276 A1  Oct. 9, 2008

(51) Int. Cl.
*G06F 11/00* (2006.01)
(52) U.S. Cl. .................................................. 714/38.1
(58) Field of Classification Search ............... 714/38.1
See application file for complete search history.

(56) References Cited

U.S. PATENT DOCUMENTS

| | | | |
|---|---|---|---|
| 6,597,907 B1 * | 7/2003 | Pruitt et al. | 455/423 |
| 2004/0078540 A1 * | 4/2004 | Cirne et al. | 711/170 |
| 2005/0076184 A1 * | 4/2005 | Schumacher | 711/170 |
| 2008/0178189 A1 * | 7/2008 | Findeisen et al. | 718/104 |
| 2008/0294936 A1 * | 11/2008 | Hogstrom et al. | 714/8 |
| 2010/0153922 A1 * | 6/2010 | Obata et al. | 717/124 |

OTHER PUBLICATIONS

Linux Forums "How to programmatically monitor a process memory usage?" Nov. 16, 2006 http:/www.linuxforums.org.*

* cited by examiner

*Primary Examiner* — Bryce Bonzo
(74) *Attorney, Agent, or Firm* — RG & Associates

(57) ABSTRACT

A process for monitoring memory growth of a software application includes measuring a baseline memory usage for processes operating on a computer system. A background memory logging script is then executed to log process memory usage. At some later time, a trending script is executed which outputs a list showing how memory usage has changed for each process operating on the system.

16 Claims, 3 Drawing Sheets

MEMORY GROWTH DETECTION

FIELD OF THE INVENTION

This disclosure relates to processes, systems, computer readable media and methods for monitoring memory usage of programs, software and applications operating on a computer system.

BACKGROUND OF THE INVENTION

Memory leak or memory growth describes a scenario where the memory usage of a particular software application operating on a computer system gradually increases over time. Memory leak can apply to any operating system that uses a processor and memory to execute a process, such as a stand alone computer, computer network, cellular phone, laptop, mobile browser etc. The impact of unchecked memory growth includes degraded performance, depletion of memory resources, and eventually system failures.

Memory leak is most often analyzed during software development but may be a problem in marketed software applications. A problem with existing methods and applications for analyzing memory leak is that they can be very resource intensive and slow when running. They can also impact on the processes being analyzed making it difficult to ascertain the true extent of the memory leak problem.

What is required is a system, method and computer readable medium that can monitor memory growth in an efficient manner without being invasive on the software being analyzed.

SUMMARY OF THE INVENTION

In one aspect of the disclosure, there is provided a method for memory growth detection comprising defining a baseline memory usage for at least one process operating in a computer system, periodically logging a memory usage for the at least one process, and comparing a logged memory usage and the baseline memory usage.

In one aspect of the disclosure, there is provided a computer readable medium comprising instructions for executing a logging script that periodically logs memory usage for processes running on a computer system, and while the logging script is running, executing a trending script that produces an output indicating trends in memory usage of the processes.

In one aspect of the disclosure, there is provided a computer system for testing a software application. The computer system comprises at least one memory utilized during execution of the software application and at least one processor configured to execute the software application. The processor is further configured to execute a memory monitoring process that records a memory usage of the software application while the software application is executing and output a memory log of the software application.

BRIEF DESCRIPTION OF THE DRAWINGS

The invention will now be described, by way of example only, with reference to specific embodiments and to the accompanying drawings in which.

DETAILED DESCRIPTION OF THE INVENTION

Figure 1:
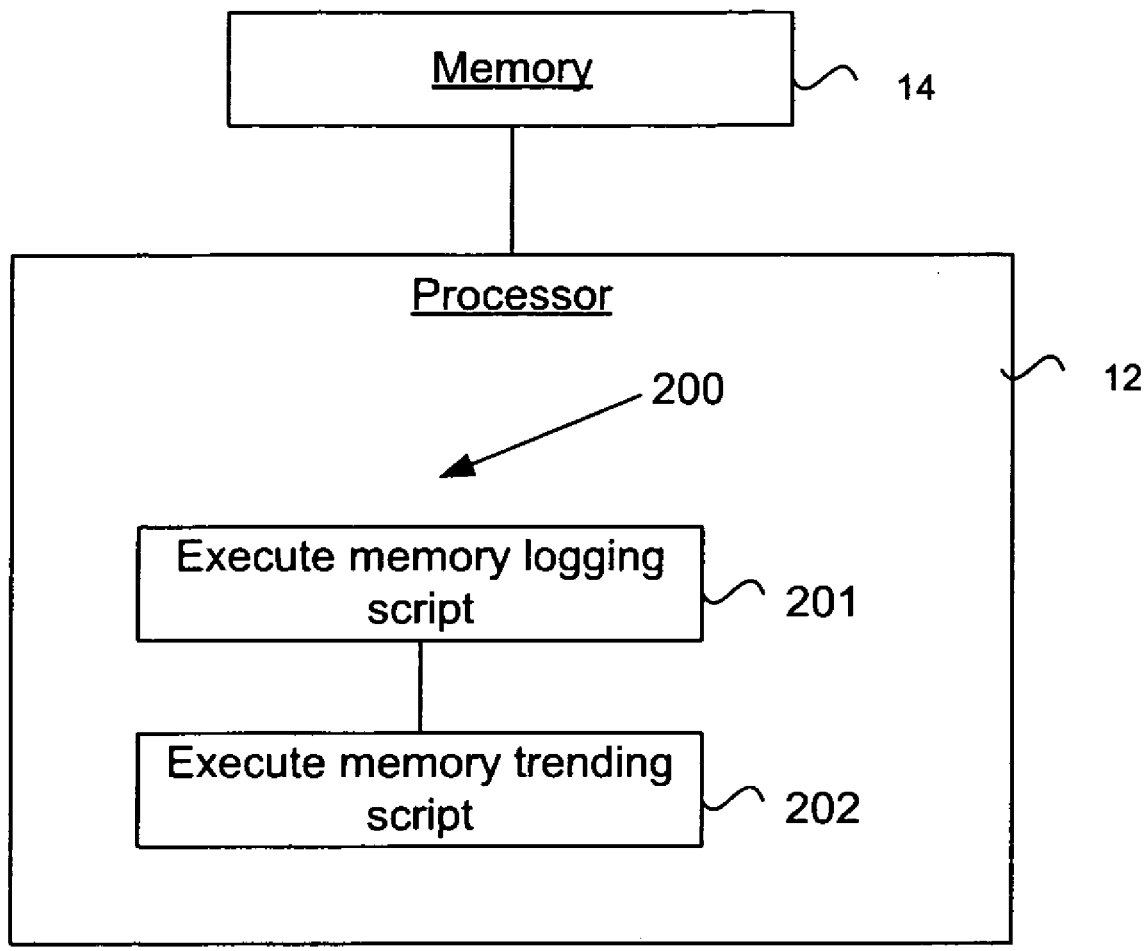
FIG. 1 schematically illustrates a processor and memory on which an instruction set may be executed.

In FIG. 1, there is shown a processor 12 operatively associated with at least one memory 14. The processor 12 and memory 14 may form a system, such as a computer system 20 shown in FIG. 2 which includes at least one processor 22 and memory 24. The computer system 20 may be a stand alone machine, or may interface with other computer systems 25 in a local area network 26. Alternatively or in addition, the computer system 20 may interface with other computer systems 27, servers, databases etc through the internet 28.

Figure 3:
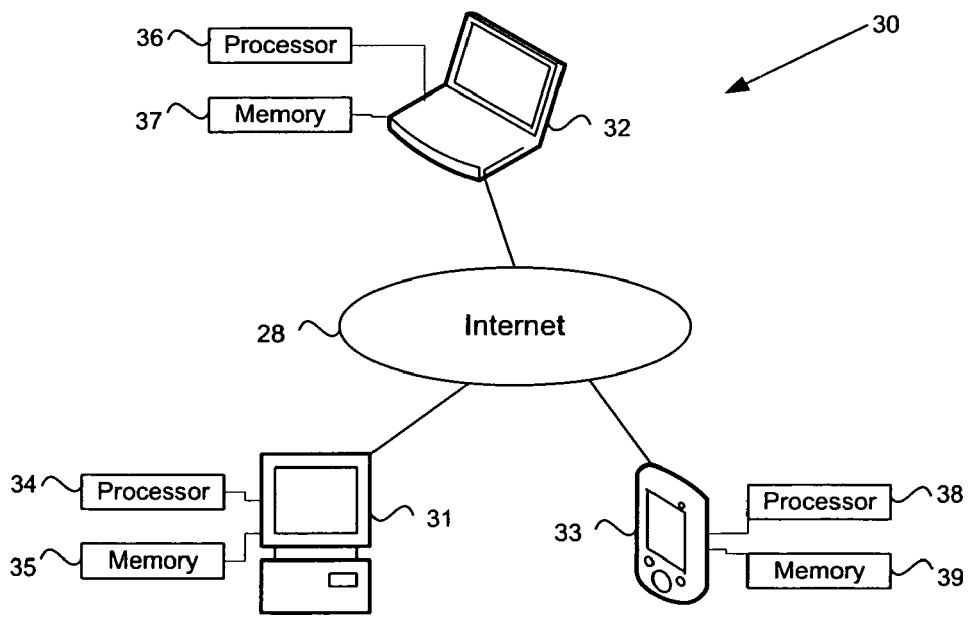
FIG. 3 schematically illustrates a network of devices, each having a processor and memory.

The term computer system as used herein is includes any device on which a software application or process may be executed. FIG. 3 shows a network 30 including an array of different devices such as a computer 31, laptop 32, cellular phone 33, etc, each of which may be connected to the internet 28. The computer 31 may include a processor 34 and operatively associated memory 35. The laptop 32 may include a processor 36 and operatively associated memory 37. The cellular phone 33 may have a processor 38 and an operatively associated memory 39.

Figure 2:
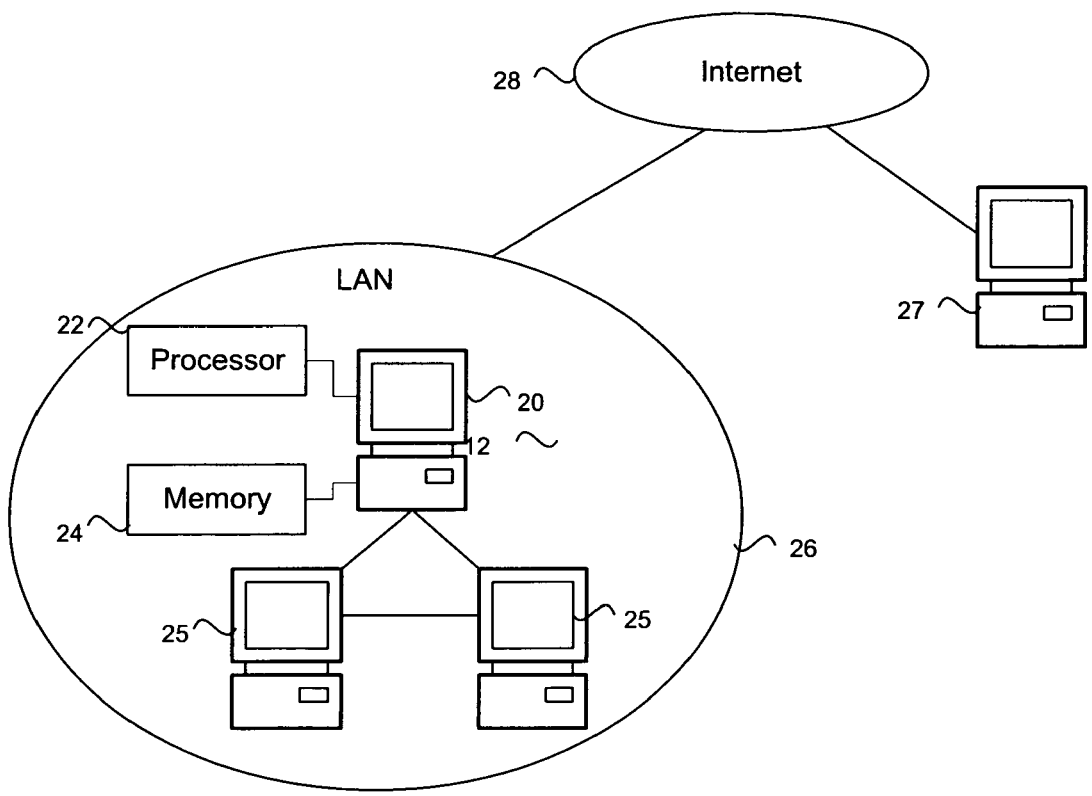
FIG. 2 schematically illustrates a computer system and network.

For each of the computer systems and devices illustrated in FIGS. 1 to 3, the memory may include a read only memory (ROM) that may store software and instruction sets for one or more applications and processes that may be executed on the respective processor. The memory may also include a random access memory (RAM) that may be used during execution of software applications and processes. As is known in many operating systems, each process may have a unique program identifier (PID) that allows various commands and actions to be performed on the process.

In accordance with an embodiment of the disclosure, a procedure may be performed that can highlight processes that potentially have memory leak or memory growth issues. The memory leak detection mechanism can determine, at runtime, if software operating on the computer system is growing in physical and/or virtual size. The results of the determination can be reported to a user. The procedure, to be described below, can be executed in the background of the operating system and can thus have negligible impact on the software that is being analyzed.

Figure 4:
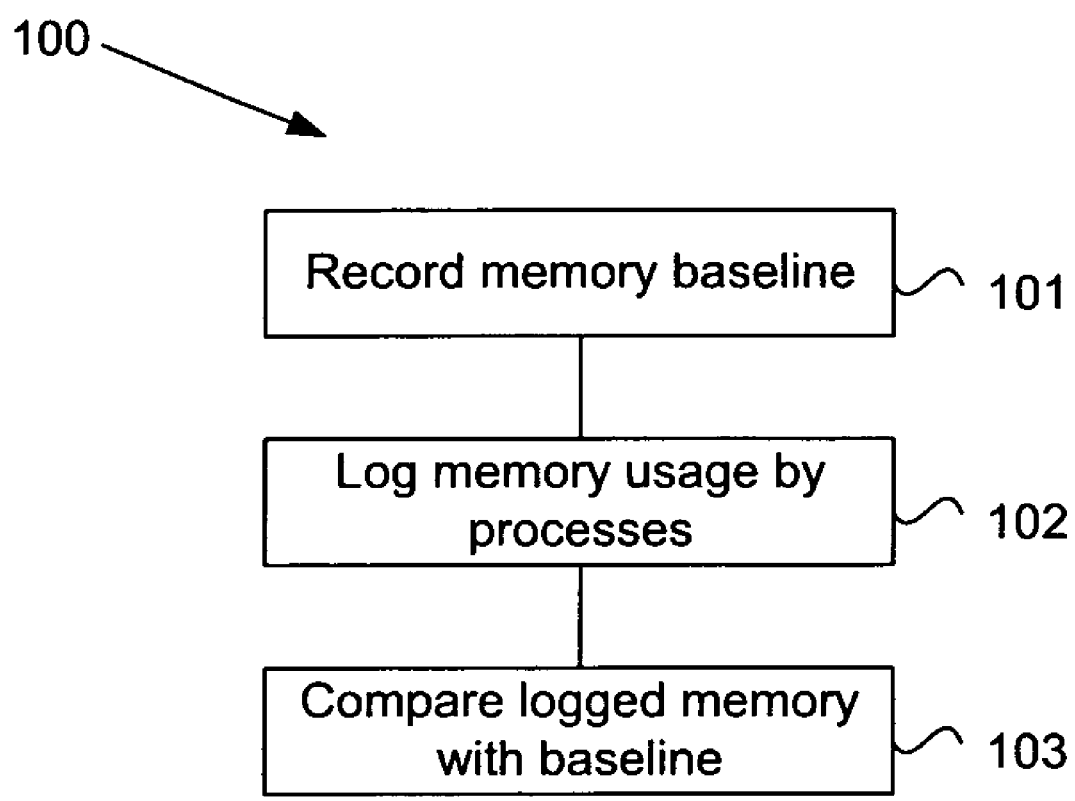
FIG. 4 illustrates a method in accordance with an embodiment of the disclosure.

In one embodiment illustrated in FIG. 4, a method 100 for memory growth detection commences at step 101 by recording a baseline memory usage for one or more processes operating on a computer system, such as a processor and memory system of any of the devices shown in FIGS. 1 to 3. At step 102, memory usage for the processes is periodically logged and compared with the baseline (step 103) to determine growth in memory by any of the processes.

A method for memory growth detection may be provided as a computer readable medium comprising a set of instructions that may be executed on a processor, such as any of the processors shown in FIGS. 1 to 3. For example, the generic processor 12 of FIG. 1 may execute a process 200 including executing a logging script (201) that periodically logs memory usage for processes running on a computer system. While the logging script is running, a trending script may be executed (202) that produces an output indicating trends in memory usage of the processes.

In one embodiment, the memory growth detection mechanism uses standard UNIX-like utilities, e.g. ps, cat, awk, grep, uniq, etc., to perform the memory growth detection. The method uses four UNIX shell scripts, PSTREND_SETUP, PSSCRIPT, PSTREND and PSDIFF, which will each be described separately below.

The ps command is a command that displays the currently running processes. The pstrend_setup script executes the standard ps command to capture baseline data regarding the physical and logical size of software running on the computer system at an initial time. The pstrend_setup script also invokes psscript on the computer system and passes the script configuration parameters on the command line which allows the script to run indefinitely in the background. The psscript script logs data regarding the physical and logical size of the software running on the computer every X minutes, where X is a user configurable parameter.

While psscript is running, a user may, at any time, call the pstrend script. The pstrend script reports a trend in the size changes of each process, when available. Over a period of time, by running pstrend and looking at the results, the user can determine which software processes running on a machine are growing in size and are therefore potential candidates for a memory leak. Flagged processes may then be further analyzed by software developers, process designers, system managers etc to determine if a memory leak is actually occurring.

An example of the pstrend_setup utility is shown in Table 1:

TABLE 1 pstrend_setup

```
#!/bin/sh
PSTREND_HOME=/home2/pstrend
FREQUENCY=30
FREQ_MIN=5
if [ $# -gt 1 ]
then
    echo "Usage: pstrend_setup [frequency_minutes]"
    exit
fi
if [ $# -eq 1 ]
then
    if [ $1 = "STOP" ]
    then
        psscript_pid=`ps -ef | grep psscript | grep -v grep | awk '{print $2}'`
        kill -9 ${psscript_pid}
        echo "Process size data collection has stopped running."
        echo
        exit
    fi
    if [ $1 -lt ${FREQ_MIN} ]
    then
        FREQUENCY=${FREQ_MIN}
    else
        FREQUENCY=$1
    fi
fi
if [ ! -d ${PSTREND_HOME} ]
then
    mkdir ${PSTREND_HOME}
fi
/bin/rm -f ${PSTREND_HOME}/psscript.out
ps -e -opid,vsz,rss,args > ${PSTREND_HOME}/ps.out.orig
psscript ${FREQUENCY} > ${PSTREND_HOME}/psscript.out &
echo "Process size data to be collected every ${FREQUENCY} minutes beginning now."
echo
echo "You may run pstrend at anytime to review any trends in memory growth for"
echo "processes where this applies."
echo
```

As shown, the pstrend_setup invokes the ps command and records baseline data into a file ps.out.orig. The script also allows a user to set a logging frequency through the variable FREQUENCY. The script then calls psscript with the FREQUENCY variable.

An example of the psscript utility is shown in Table 2:

TABLE 2 psscript

```
#!/bin/sh
PSTREND_HOME=/home2/pstrend
if [ $# -ne 1 ]
then
    echo "Usage: psscript <interval-in-minutes>"
    exit 1
fi
while [ 1 ]
do
    date
    ps -e -opid,vsz,rss,args > ${PSTREND_HOME}/ps.out.new
    psdiff ${PSTREND_HOME}/ps.out.orig ${PSTREND_HOME}/ps.out.new
    echo ""
    echo ""
    sleep `expr $1 \* 60`
done
```

The psscript utility also calls the ps command and outputs the results to a file ps.out.new. The script then calls the psdiff utility, described below, which compares the sizes of the currently running processes in ps.out.new against the baseline of ps.out.orig.

An example of the psdiff utility is shown in Table 3:

TABLE 3 psdiff

```
#!/bin/sh
##############################################################

# FUNCTION: main( )

# PURPOSE: Given 2 files (with 'top' output), this program will
#          report differences in either SIZE or RES of each PID
#          contained in both files.

##############################################################
if [ $# -ne 2 ]
then
    echo "Usage: $0 <file1> <file2>"
    exit 1
fi
echo
##############################################################

# Get all lines in the first file where STATE is either 'cpu*',
# 'run'
# or 'sleep', thereby skipping over all of the unwanted lines
# (top of
# file and header line). Use awk to parse the lines to the
# format:
# <pid>,<size>,<res>,<command>
##############################################################
for line in `cat $1 | grep -v PID | awk '{print $1 "," $2 "," $3 "," $4}'`
do
##############################################################
# Use nawk (with token delimeter = ",") to extract each
# value from
# the result
##############################################################
    pid=`echo $line | nawk 'FS="," {print $1}'`
    vsz=`echo $line | nawk 'FS="," {print $2}'`
```

TABLE 3-continued psdiff

```
        rss=`echo $line | nawk 'FS=","' {print $3}'`
        cmd=`echo $line | nawk 'FS=","' {print $4}'`
##########################################################
# Use awk to find the line from the second file ($2) and
# print to the same format above (","-delimited lines with
# 4 values).
##########################################################
        line2=`cat $2 | awk ' $1 == pid && $4 == cmd {print $1
"," $2 "," $3 "," $4}' pid=$pid cmd=$cmd`
##########################################################
# Grep for the command in the line. $line2 will be empty
# if this command is not in the second file. If this is
# the case, then the grep will return a status of non-zero.
# If we find that this command isn't in the second file,
# then we just continue.
##########################################################
        echo $line2 | grep $cmd > /dev/null 2>&1
        if [ $? -ne 0 ]
        then
            continue
        fi
##########################################################
# Use nawk (with token delimeter = ",") to extract each
# value from the line gotten from the second file.
##########################################################
        pid2=`echo $line2 | nawk 'FS=","' {print $1}'`
        vsz2=`echo $line2 | nawk 'FS=","' {print $2}'`
        rss2=`echo $line2 | nawk 'FS=","' {print $3}'`
        cmd2=`echo $line2 | nawk 'FS=","' {print $4}'`
##########################################################
# If there are differences in either RES or SIZE between
# the two files then output that to the screen.
##########################################################
        if [ $rss -ne $rss2 -o $vsz -ne $vsz2 ]
        then
            echo "$1: CMD=$cmd, PID=$pid, VSZ=$vsz RSS=$rss"
            echo "$2: CMD=$cmd2, PID=$pid2, VSZ=$vsz2 RSS=$rss2"
            echo
        fi
done
exit 0
```

The psdiff utility extracts lines of the input files (ps.out.orig and ps.out.new) that include a PID and puts those lines into a format <pid>, <size>, <res>, <command>. Lines from each file with a common PID are then compared and if there is a difference in either <size> or <res> then an entry is made into the file psscript.out (see the invocation of psscript in the pstrend_setup utility).

An example of the pstrend utility is shown in Table 4:

TABLE 4 pstrend

```
#!/bin/sh
PSTREND_HOME=/home2/pstrend
pids_tmp=`cat ${PSTREND_HOME}/psscript.out | grep out | awk
'{print $3}' | sort | uniq`
for x in $pids_tmp
do
    pid=`echo $x | nawk 'FS="="' {print substr($2, 1,
length($2)−1)}'`
    pids="$pids $pid"
done
for x in $pids
do
    exe=`ps -ef | awk '$2==y {print $9}' y=$x`
    echo "$x :: $exe: -----------------"
    cat ${PSTREND_HOME}/psscript.out | grep new | grep
"PID=${x}," | uniq -c | awk '{print " " $1 ":\t" $5 " " $6}'
    echo ""
    echo ""
```

TABLE 4-continued pstrend

```
done
exit 0
```

The pstrend utility may be called at any time while the psscript utility is running. The utility processes the psscript.out file to concatenate the data for the various PIDs. The concatenated data for each PID shows the number of iterations for which a particular process remained at a particular memory size. The output of pstrend can therefore be analyzed to determine memory growth of operating processes.

An example of the usage of the memory detection procedure is shown in Table 5:

TABLE 5

Example

```
s80100# pstrend_setup 30
Process size data to be collected every 30 minutes beginning
now.
You may run pstrend at anytime to review any trends in memory
growth for
processes where this applies.
s80100#
----------------------------------------------------------------
s80100# pstrend
12235 :: ../bin/TblMgr: -----------------
    4: VSZ=9840 RSS=3544
    1: VSZ=1267920 RSS=1020616
   43:       VSZ=9840 RSS=3544
12243 :: ../bin/FwslpSLI.exe: -----------------
    1: VSZ=2078080 RSS=10720
    1: VSZ=2078088 RSS=10720
    1: VSZ=2078096 RSS=10720
    1: VSZ=2078104 RSS=10720
    1: VSZ=2078112 RSS=10720
    1: VSZ=2078120 RSS=10720
    1: VSZ=2078128 RSS=10720
    1: VSZ=2078136 RSS=10720
    1: VSZ=2078144 RSS=10720
    1: VSZ=2078152 RSS=10720
    1: VSZ=2078160 RSS=10720
    1: VSZ=2078168 RSS=10720
    1: VSZ=2078176 RSS=10720
    1: VSZ=2078184 RSS=10720
    1: VSZ=2078192 RSS=10720
    1: VSZ=2078200 RSS=10720
    1: VSZ=2078208 RSS=10720
    1: VSZ=2078216 RSS=10720
    1: VSZ=2078224 RSS=10720
    1: VSZ=2078232 RSS=10720
    1: VSZ=2078240 RSS=10720
    1: VSZ=2078248 RSS=10720
    1: VSZ=2078256 RSS=10720
    1: VSZ=2078264 RSS=10720
    1: VSZ=2078272 RSS=10720
    1: VSZ=2078280 RSS=10720
 193 :: /usr/sbin/syslogd: -----------------
   43:       VSZ= 3656 RSS=1952
----------------------------------------------------------------
s80100# pstrend_setup STOP
Process size data collection has stopped running.
s80100#
----------------------------------------------------------------
```

In the example of Table 5, the pstrend_setup utility is configured such that data will be collected every 30 minutes. When the pstrend utility is run several hours later, it is seen that PID 12235 (TblMgr process) ran for 4 cycles at a certain size, then grew considerably for one cycle, then was consistent in size for 43 consecutive cycles. PID 12243, (FwslpSLI.exe process) ran at the initial size for several cycles, then began growing by 8 bytes every cycle for 26 cycles. This would indicate a potential memory leak, as the process appears to be growing consistently and indefinitely. Finally, the pstrend_setup utility is invoked to STOP data collection altogether. The output of the pstrend utility is a list of changes in the memory usage. Because the list is presented chronologically, it is relatively simple for a user to view the list and determine which memory usage changes are likely to be as a result of memory leak. Providing the number of cycles for which the memory remained at a particular level in the output list also enables the user to determine memory leak issues, since memory leak is typically indicated by a regular growth of the memory.

The memory growth detection mechanism described above may run on many different platforms, in particular UNIX like platforms such as HPUX, BSD, AIX, SCO UNIX, etc. Appropriate modifications may be made to enable the memory growth detection mechanism to operate on other operating systems such as Linux, Windows, etc.

An advantage of the memory growth detection process herein described includes that the memory size detection does not require direct interrogation of the operating software and can therefore be used to analyze the software in a realistic operating environment. Use of the memory growth detection process may therefore be used by software developers and engineers and beta phase testers to analyze software under development. The process may also be used by system administrators to analyze the potential cause of system memory crashes.

The memory growth detection procedure may be invoked and executed solely within a single computer system. Alternatively, the memory growth detection procedure may be invoked on a first computer system from a second computer system through a local network or through the internet, such as shown in FIG. 2. Furthermore, the memory growth detection procedure may be executed on a variety of computer devices such as desktop computers, laptops, cellular phones, mobile browsers etc, either from the device itself or through a communication network such as the internet, as shown in FIG. 3.

A particular application of the memory growth detection procedures herein described is in monitoring and testing of software under development. For example, a user, such as a software developer or tester, may invoke the memory monitoring software to run on a computer system with memory logging every X minutes. Concurrently, the user may invoke a particular software package that is to be tested and which operates at least one process. The user may then run the process to be tested and operate the process under its full range of operation and in a rigorous testing regime. While the process is running, the user does not need to continually break the process to monitor memory usage or otherwise record memory usage. Once the process testing has completed, the user may view the memory logs to ascertain at what stages of the test process there were memory usage changes and whether any of those memory usage changes are indicative of potentially hazardous memory leaks. For example, continual growth of memory for greater than Y cycles may be indicative of a memory leak. The value of Y may be dependent on the logging period, but may for example be greater than 5 cycles. Memory leak may also be indicated by gradual growth of small amounts of memory, say, less than Z bytes rather than large memory changes which may occur when a process under test performs a specific, memory intensive function.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via a plurality of protocols.

What is claimed is:

1. A method for memory growth detection comprising:

defining a baseline memory usage for at least one process operating in a computer system by executing a first script that captures a physical and logical memory size of the at least one process operating on the computer system at an initial time, the first script configured to invoke a second script to run indefinitely in the background of the computer system;

periodically logging a memory usage during a predefined period of time via the second script, for the at least one process while the at least one process is currently running, the logged memory usage comprising the physical and the logical memory size of the at least one process operating in the computer system;

comparing the logged memory usage and the baseline memory usage by comparing a memory size of the at least one process that is currently running to the baseline memory usage; and determining a trend in memory size changes of the at least one process based on the periodic logging of the memory usage during the predefined period of time.

2. The method according to claim 1 further comprising outputting a result indicative of a difference between the logged memory usage and the baseline memory usage.

3. The method according to claim 1 wherein said script logs a memory usage of a plurality of processes operating on the computer system.

4. The method according to claim 1 wherein defining a baseline memory usage comprises recording a memory usage of processes operating on the computer system at an initial time.

5. The method according to claim 4 wherein recording a memory usage comprises executing a ps command.

6. The method according to claim 1 further comprising generating a list of memory usage changes for said at least one process.

7. The method according to claim 6 wherein said list comprises changes in memory usage between logging cycles for the at least one process.

8. The method according to claim 6 comprising ascertaining from said list whether memory usage changes are indicative of memory leak.

9. The method according to claim 1 comprising executing a first utility to produce a log file of memory usage for the at least one process, said log file comprising a comparison with said baseline memory usage.

10. The method according to claim 9 comprising executing a second utility that processes said log file to produce a list associating the at least one process with changes in memory usage of the respective at least one process.

11. A non-transitory computer readable storage medium comprising instructions that when executed cause a processor to perform:
defining a baseline memory usage for processes operating in a computer system by executing a first script that captures a physical and logical memory size of the processes operating on the computer system at an initial time, the first script configured to invoke a logging script to run indefinitely in the background of the computer system;
executing the logging script that periodically logs memory usage during a predefined period of time for the processes running on the computer system while the processes are currently running, the logged memory usage comprising the physical and the logical memory size of the processes;
comparing a memory size of the processes that are currently running to the baseline memory usage; and
executing a trending script while the logging script is running, the trending script producing an output indicating a trend in memory size changes of the processes based on the periodic logging of the memory usage during the predefined period of time.

12. The non-transitory computer readable storage medium according to claim 11 comprising instructions for recording the baseline memory usage for said processes.

13. The non-transitory computer readable storage medium according to claim 11 comprising instructions for generating a list associating a process with memory usage by the process.

14. The non-transitory computer readable storage medium according to claim 11 further comprising instructions for configuring a logging period.

15. A computer system for testing a software application, the computer system comprising:
at least one memory utilized during execution of said software application; and
at least one processor configured to:
execute said software application;
execute a first script to define a baseline memory usage for at least one process of the software application operating in the computer system by capturing a physical and logical memory size of the at least one process of the software application operating on the computer system at an initial time, the first script configured to invoke a memory monitoring process to run indefinitely in the background of the computer system;
execute the memory monitoring process that periodically records a memory usage during a predefined period of time of said at least one process of the software application while said software application is executing in the computer system, the recorded memory usage comprising the physical and the logical memory size of the at least one process of the software application;
compare a memory size of the at least one process of said software application that is currently running to the baseline memory usage;
determine a trend in memory size changes of the software application based on the periodic recording of the memory usage during the predefined period of time; and
output a memory log of said software application.

16. The computer system according to claim 15 wherein said memory log comprises changes in memory usage of the software application between logging cycles.

* * * * *